Oct. 11, 1955   F. J. BRADBURY   2,720,295
CONTROL MECHANISM FOR THE TRANSMISSION
SYSTEMS OF MOTOR VEHICLES
Filed Feb. 14, 1952   5 Sheets-Sheet 3

Inventor
Frederick James Bradbury
By
Stevens, Davis, Miller & Mosher
his attorneys

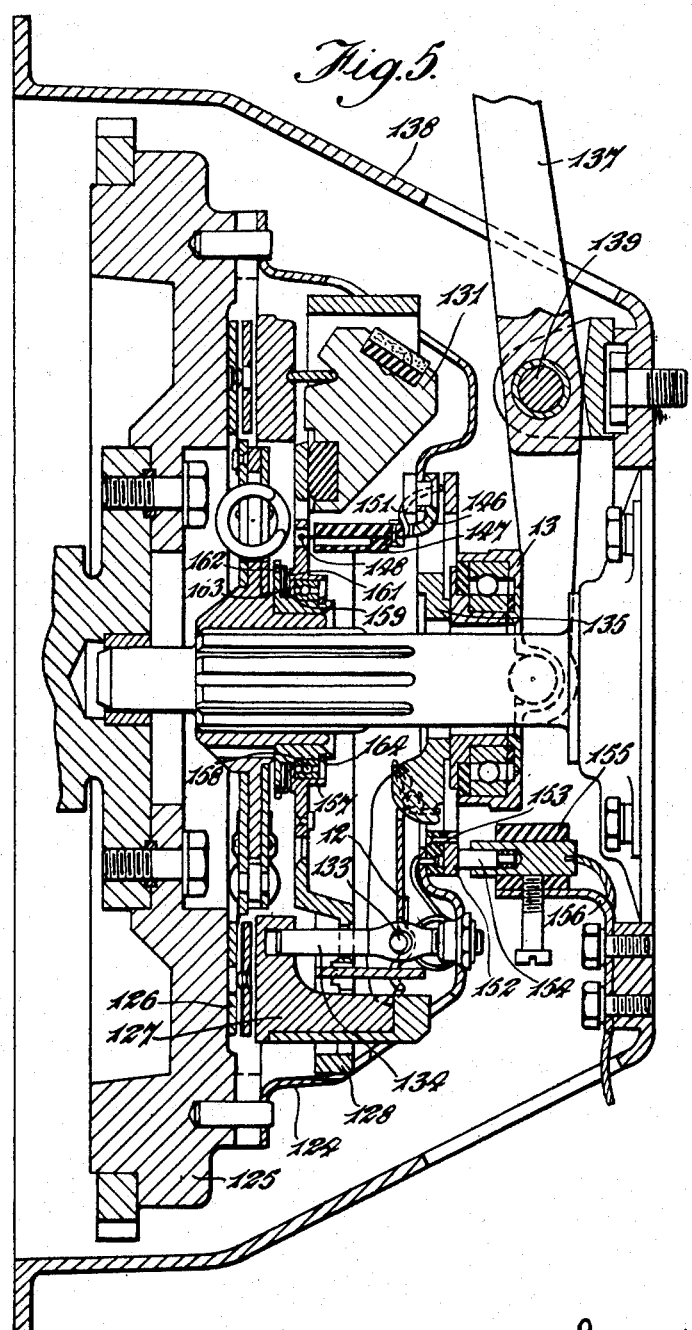

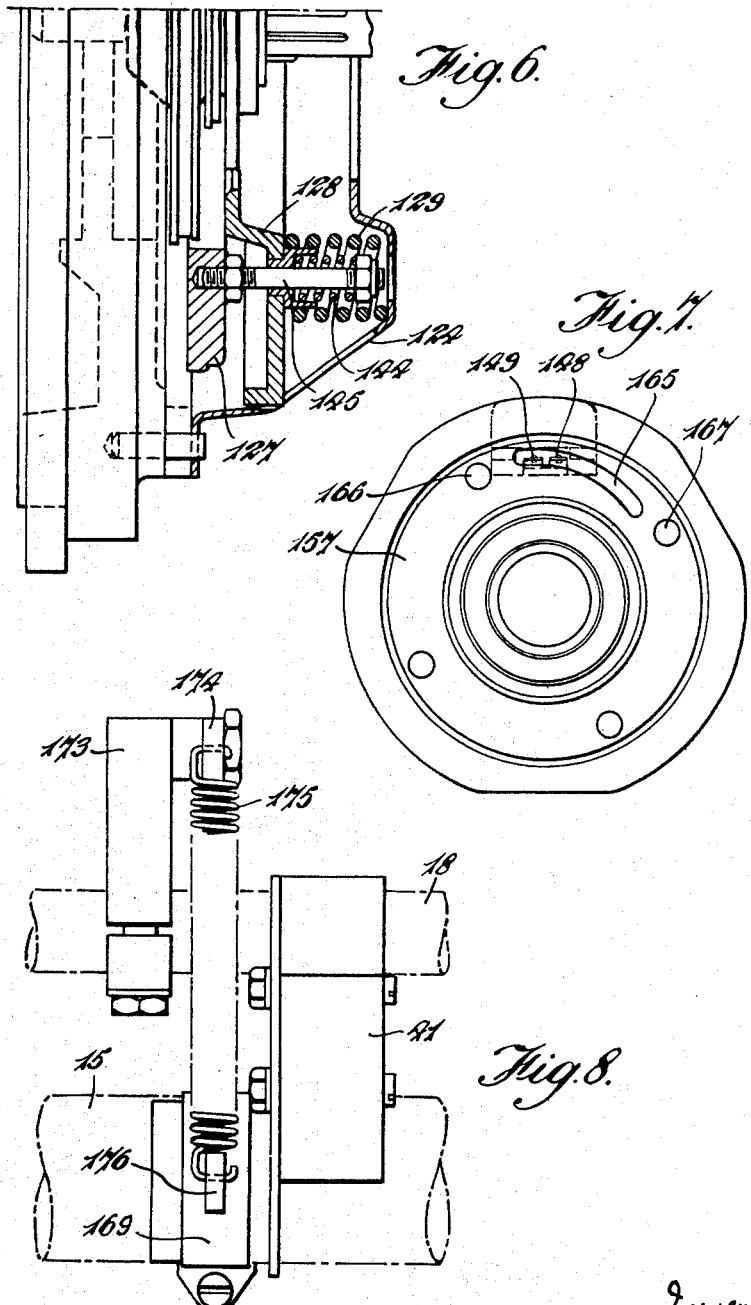

United States Patent Office 2,720,295
Patented Oct. 11, 1955

2,720,295

CONTROL MECHANISM FOR THE TRANSMISSION SYSTEMS OF MOTOR VEHICLES

Frederick James Bradbury, Leamington Spa, England, assignor to Automotive Products Company Limited, Leamington Spa, England Application February 14, 1952, Serial No. 271,606

Claims priority, application Great Britain February 20, 1951

4 Claims. (Cl. 192—.08)

This invention relates to control mechanism for the type of transmission system of motor vehicles which comprises a variable speed gear-box having a plurality of constant mesh gear trains selectively brought into action by the engagement of positive clutches, the mating elements of the said clutches being brought to the same or substantially the same speed prior to engagement by friction means; and a friction clutch through which the power is transmitted from the engine to the gear-box.

The control mechanism according to the present invention comprises, in combination, a movable member which effects directly the engagement and disengagement of the positive clutches in the gear-box, servo devices controlled by said movable member and acting to disengage the friction clutch and limit the opening of the engine throttle during a gear change, and means sensitive to relative rotation of the driving and driven members of the friction clutch for holding said clutch disengaged and at the same time adjusting the engine throttle to vary the speed of the driving member, said means permitting re-engagement of the clutch only on the establishment of a predetermined speed relation between the driving and driven members of the clutch.

The words "effects directly" in the foregoing paragraph and in the claims mean that the movable member is connected to the gear-box shift mechanism by a mechanical linkage or liquid pressure system which transmits the movement of the member positively to said mechanism, as distinct from merely actuating a switch, valve or the like controlling a servo-motor.

The movable member which effects the engagement and disengagement of the positive clutches in the gear-box may be operated manually, or may be operated automatically in accordance with road speed and/or engine torque to provide fully automatic gear changing.

The invention is hereinafter described with reference to the accompanying drawings, in which:

Figure 5 is a sectional elevation of the clutch;

Figure 6 is a sectional elevation of the clutch in another radial plane, only one half being shown;

Figure 7 is an end elevation of the centre portion of the clutch driven plate; and Figure 8 is a side elevation of the switch mechanism controlled by the mechanical gear shift linkage.

Figure 1:
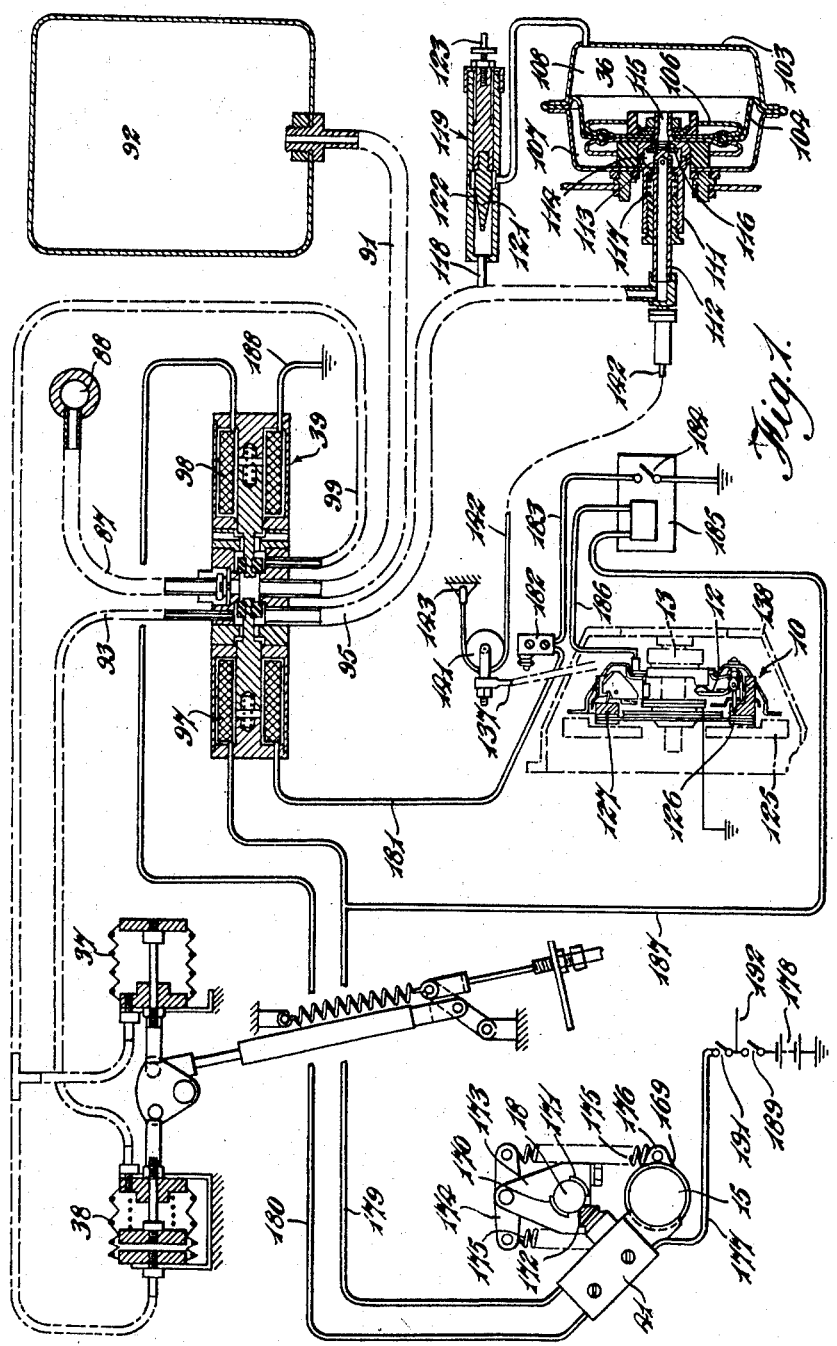
Figure 1 is a diagram showing the various elements of the clutch and throttle control systems, together with the pneumatic and electrical connections.
Figure 2:
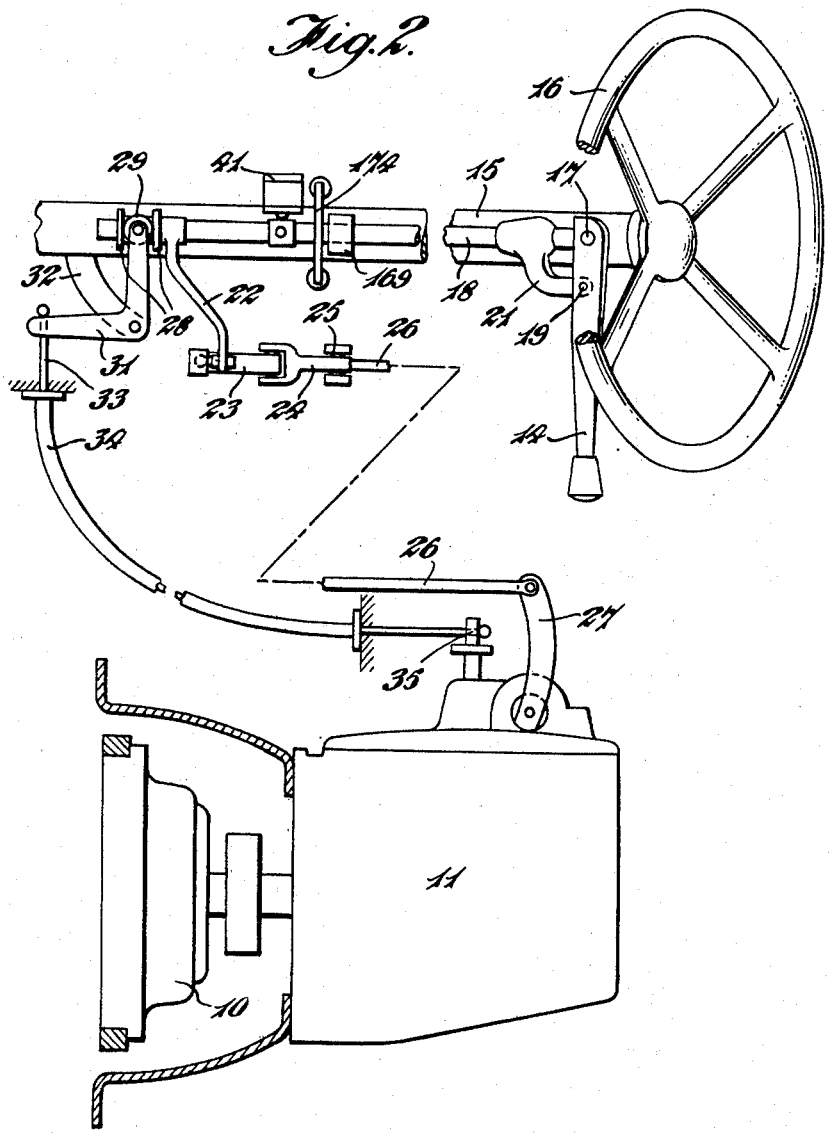
Figure 2 is a diagram showing the mechanical linkage by which the movement of the gears in the gear-box is effected.

The friction clutch of the vehicle transmission which is shown at 10 in Figures 1 and 2 is of the so-called centrifugal type, which engages automatically at a predetermined engine speed, and disengages automatically when the engine speed falls below the predetermined value. The gear-box, shown at 11 in Figure 2, provides four forward speeds and reverse, synchronizing mechanism being provided for the second, third and fourth forward speeds, and, if desired, for first speed also. The clutch 10 is provided with release levers 12 acted on by a release bearing 13 to disengage the clutch independently of the centrifugal mechanism.

The shifting of the gears is effected manually by means of a lever 14 (Figure 2) mounted on the steering column 15 so as to lie just below the steering wheel 16, the lever being pivotally connected at 17 to a shaft 18 lying parallel to the steering column and mounted for both sliding and turning movements thereon. The lever 14 fulcrums at 19 on a member 21 which is held against axial movement but is capable of turning with the shaft 18, so that movement of the lever in a plane parallel to that of the steering wheel 16 turns the shaft 18, whilst movement of the lever in a plane perpendicular to that of the steering wheel moves the shaft 18 axially. An arm 22 fixed to the shaft 18 adjacent the lower end of the steering column is coupled, by a link 23, to a bell crank-lever 24 mounted in suitable bearings 25 on the vehicle, the bell-crank lever 24 being in turn connected, by a link 26, to a lever 27 on the gear-box. The lever 27 operates to displace any selected shift bar of the gear-box and thus engage the gears.

Below the arm 22, a pair of spaced flanges 28 are secured to the shaft 18, and between these flanges is engaged a roller 29 mounted on one arm of a bell-crank lever 31 fulcrumed on a bracket 32, the other arm of the lever 31 being connected, by a cable 33 working in a sheath 34, to a lever 35 on the gear-box, this lever acting to select the appropriate shift bar in the gear box. Thus axial movement of the shaft 18 effects the selection of the appropriate shift bar through the bell-crank lever 31 and cable 33, whilst turning movement of the shaft 18 engages the gears through the arm 22, link 23, bell-crank lever 24 and link 26.

A vacuum servo-motor 36 (Figure 1) is provided to operate the clutch disengaging mechanism, and two further vacuum servo-motors 37 and 38 actuate the throttle valve (not shown) in the induction system of the vehicle engine, the throttle valve being also controllable by a pedal in the usual manner, but only subject to the overriding control of the servo-motors. The servo-motor 37 acts to close the throttle, and the servo-motor 38 to open it.

The servo-motors are controlled by a solenoid-operated valve unit 39 (Figures 1 and 4), the energisation of the solenoids being controlled by an electric switch 41 actuated by turning movement of the shaft 18, and the electric contacts, described hereinafter, controlled by the relative speeds of rotation of the driving and driven members of the clutch.

Figure 3:
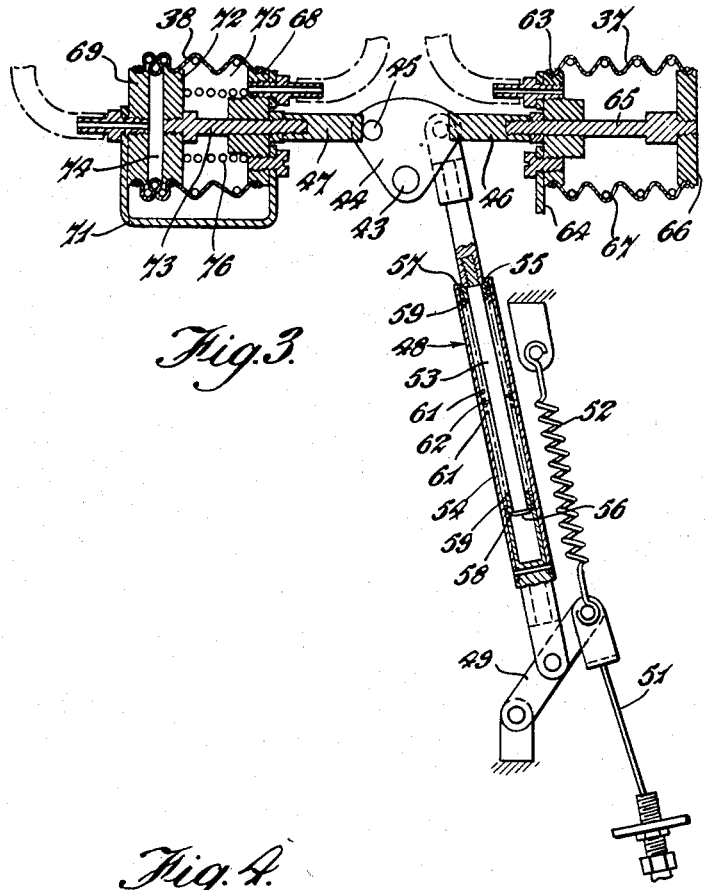
Figure 3 is a sectional elevation, on an enlarged scale, of the throttle control system.

The throttle controlling system, including the servo-motors 37 and 38, is shown in detail in Figure 3, the carburetter and throttle valve being omitted, but the throttle valve spindle being shown at 43. A sector-shaped plate 44 is fixedly mounted on the throttle valve spindle 43, and a pin 45 projects from one side of the plate 44, at a point offset from the axis of the spindle 43, to cooperate with two movable stops 46 and 47. Pivotally attached to the other side of the plate 44, at a point offset from the axis of the spindle 43, is one end of a resilient link 48, the other end of which is pivoted to an arm 49 connected by a cable 51 to the normal throttle control (not shown). A return spring 52 for urging the throttle valve to the closed position is also connected to the arm 49. The resilient link 48 comprises inner and outer telescoping members 53 and 54, the inner member 53 having a pair of opposed external shoulders 55 and 56, and the outer member 54 having a pair of opposed internal shoulders 57 and 58, the two pairs of shoulders being equally spaced. A pair of sleeves 59, urged apart by springs 61 between which is interposed a washer 62, co-operate with the shoulders to urge the members 53 and 54 to a position in which the shoulders 55 and 57 and the shoulders 56 and 58 are respectively in common planes, extension or compression of the link causing compression of the springs.

The stops 46 and 47 are associated respectively with the servo-motors 37 and 38, which are in the form of bellows. The servo-motor 37 has one inner end plate 63 fixed to a bracket 64, the stop 46 being carried by a rod 65 passing through the inner end plate 63 and secured to the outer end plate 66 of the servo-motor, a spring 67 being incorporated in the bellows to urge the end plates apart. The servo-motor 38 has inner and outer end plates 68 and 69 both fixed to a bracket 71, and a movable intermediate plate 72 carrying a rod 73 slidable in the inner end plate 68, the rod 73 carrying the stop 47. The servo-motor 37 and the chamber 74 of the servo-motor 38 between the outer end plate 69 and the intermediate plate 72 have a common connection to the solenoid operated valve unit 39, and the other chamber 75 of the servo-motor 38 has a separate connection to the said valve unit. A spring 76 in the chamber 75 urges the intermediate plate 72 towards the outer end plate 69.

Figure 4:
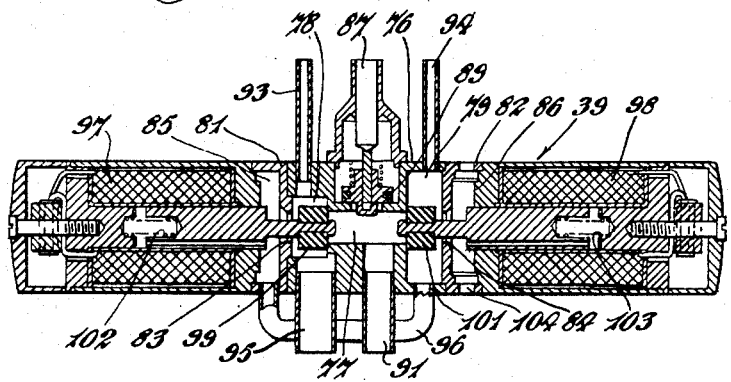
Figure 4 is a sectional view, on an enlarged scale, of the solenoid operated valve.

The solenoid operated valve unit 39, which is shown in detail in Figure 4, comprises a body 76 having an axial bore 77 which is counterbored at both ends to provide recesses 78 and 79, the recesses being closed by end caps 81 and 82 formed with central openings 83 and 84 leading respectively into chambers 85 and 86 in the end caps. A conduit 87, connected to the inlet manifold of the vehicle engine (indicated at 88 in Figure 1) leads into the bore 77, a non-return valve 89 being provided to prevent flow of air into the bore 77 from the inlet manifold. Another conduit 91 connects the bore 77 to a vacuum reservoir 92 (Figure 1). A conduit 93 leads from the recess 78 to the chamber 75 in the servo-motor 38, and a conduit 94 leads from the recess 79 to the chamber 74 of the servo-motor 38, and to the servo-motor 37. Another conduit 95 leads from the recess 78 to the servo-motor 36 for disengaging the clutch. The recess 79 and the chamber 85 are connected together by a conduit 96, shown, for clearness, as an external pipe, but conveniently formed in practice as a bore in the body 76. Solenoids 97 and 98 are mounted respectively on the end caps 81 and 82, the armatures of the solenoids carrying respectively valve heads 99 and 101 located in the recesses 78 and 79. The armatures are urged inwardly by springs 102 and 103 respectively to seat the valve heads on the shoulders at the inner ends of the recesses so as to close the ends of the bore 77, energisation of the respective solenoids drawing the valve heads outwardly so that they close respectively the openings 83 and 84 in the end caps 81 and 82. Air inlet ports 104 are provided in the cap 82.

The clutch-operating servo-motor 36 comprises a casing 105 in which is mounted a diaphragm 106 dividing the casing into two chambers 107 and 108, the chamber 107 being open to the atmosphere. The central portion of the diaphragm 106 is rigid, and is surrounded by a flexible portion 109, the central rigid portion carrying a valve body 111 in which is mounted, for limited sliding movement, a pull-rod 112. The pull-rod 112 is tubular, being closed at its end which enters the valve body 111 and having radial ports 113 opening into a chamber 114 in the valve body, which chamber is connected by a port 115 to the chamber 108 of the servo-motor. The pull-rod 112 carries a valve disc 116, and a spring 117 acting on the pull-rod urges the disc 116 to a position in which it closes the port 115, thus isolating the chamber 114 from the working chamber 108. The conduit 95 is connected to the passage in the hollow pull-rod 112. A by-pass passage 118 connects the working chamber 108 directly to the conduit 95, a variable restricting device 119 being interposed in the passage 118. The device 119 comprises a tapered needle 121 co-operating with an orifice 122, and the needle 121 is connected by a rod 123 to the accelerator pedal of the vehicle, so that the degree of restriction varies with the position of the accelerator pedal.

The clutch 10 (Figures 1, 5 and 6) comprises the usual cover plate 124 bolted to the engine flywheel 125, a driven plate 126 which, when the clutch is engaged, is clamped between the flywheel 125 and a pressure plate 127, a spring abutment plate 128 interposed between the pressure plate 127 and the cover plate 124, springs 129 (Figure 6) acting between the cover plate 124 and the spring abutment plate 128, and centrifugally actuated weights 131 (Figure 5) acting between the spring abutment plate 128 and the pressure plate 127. The release levers 12 are fulcrumed at 133 on studs 134 located in the cover plate 124, and engage at their inner ends with a release lever plate 135 which is in constant engagement with the release bearing 13, which is pivotally connected to a clutch operating lever 137 fulcrumed on a clutch housing 138 at 139. The other end of the operating lever 137 carries a pulley 141 (Figure 1) over which passes a cable 142, one end of the cable being secured to the pull-rod 112, and the other end to a fixed anchorage 143. The pressure plate 127 is urged towards the spring abutment plate 128 by return springs 144 (Figure 6) surrounding studs 145 screwed into the pressure plate.

A bracket 146 riveted to the cover plate 124 carries a block 147 of insulating material on which are mounted two resilient contact fingers 148 and 149, which project towards the driven plate 126. The contact finger 148 is connected directly to the cover plate 124, but the contact 149 is insulated, and is connected by a conductor 151 to a slip ring 152 mounted by means of insulating blocks 153 on the cover plate 124. A spring loaded brush 154, mounted in an insulating block 155 on a bracket 156 bolted to the clutch housing 138, is in constant engagement with the slip ring 152.

A cam ring 157 is mounted on the hub of the clutch driven plate 126, on a ball-bearing 158, friction means being incorporated between the cam ring 157 and the driven plate so that the former tends to rotate with the latter, but is able, when constrained so to do, to turn in relation to it. The friction means comprise a washer of friction material 159 located against the face of the cam ring 157, a flat metal washer 161 in contact with the opposite face of the washer 159 and held against rotation relative to the driven plate 126 by bent-over nibs 162 engaging in notches in the driven plate, and a crimped resilient metal washer 163 interposed between the washer 161 and the driven plate, the whole assembly being compressed axially by a spring ring 164 located in a groove in the hub of the driven plate 126, and engaging the inner race of the ball-bearing 158. The cam ring 157 is provided with an eccentric arcuate cam slot 165 (Figure 7) into which the contact fingers 148 and 149 extend, and with two stop members 166 and 167 which, by co-operating with the insulating block 147, limit the angular movement of the cam ring relative to the driving member of the clutch. The cam slot 165 is so arranged that when the clutch driving member is rotating faster than the driven member, so that the cam ring is dragged backwardly by the driven plate, the contact fingers are free in the slot 165, but when the clutch driving member is lagging behind the driven member, so that the cam ring is dragged forwardly by the driven plate, the contact fingers are brought into engagement with the outer edge of the cam slot, and are thus connected together electrically.

The switch 41 is a two-way switch (Figures 1 and 8) and is mounted, by means of a bracket clip 169, on the steering column 15 of the vehicle, the switch being operated by cam strips 170, 171 secured to the shaft 18, the arrangement being such that when the shaft 18 is in a position corresponding to engagement of any gear, one or other of the cam strips 170, 171 engages the operating plunger 172 of the switch 41, and presses it inwardly. The initial turning movement of the shaft when a gear is disengaged causes the plunger 172 to ride off the cam strip, thus reversing the switch 41, which remains in the reversed position until another gear is engaged. A bracket 173 clamped to the shaft 18 adjacent the cam strips 170, 171 carries a rocking yoke 174 and two tension springs 175, 175 extend between the ends of the rocking yoke 174 and ears 176 on the bracket clip 169, these springs 175 tending to urge the rod to turn in either direction from a dead centre position (neutral) so as to hold it in a position corresponding to the engagement of any gear.

A common contact in the switch 41 is connected by a conductor 177 (Figure 1) to one pole of the battery 178, and the other two contacts are connected respectively by conductors 179 and 180 to the solenoids 97 and 98, the contact connected to the solenoid 97 being that which is engaged with the common contact when any gear is engaged, and the contact connected to the solenoid 98 being that which is engaged with the common contact when the gears are disengaged. The other end of the solenoid 97 is connected by a conductor 181 to a normally open switch 182 which is closed when the clutch is disengaged by the servo-motor 36, being, for example, mechanically actuated by the operating lever 137, the other lead 183 from the switch 182 being earthed through the contacts 184 of a relay 185, the contacts 184 being open when the relay is de-energized. The brush 154 is connected by a conductor 186 to the coil of a relay 185, which is in turn connected by a conductor 187 to the conductor 179. The pole of the battery other than that to which the conductor 177 is connected is earthed. The other end of the solenoid 98 is earthed through the conductor 188.

The conductor 177 is connected to the battery 178 through the ignition switch 189 of the vehicle, and a main control switch 191 for the transmission control system, the two switches 189 and 191 being in series. The conductor leading to the vehicle ignition system is indicated at 192.

The transmission control system above described operates in the following manner. When the gear lever 14 is in the neutral position, and both the main switch 191 of the control system and the ignition switch 189 are closed, the solenoid 98 is energised, thus moving the valve head 101 from the position shown in Figure 4, in which it cuts off the chamber 79 from the suction, to a position in which it closes the opening 84, and so cuts off the recess 79 from the air inlet ports 104. The conduit 94 is thus connected directly to suction, and the conduits 93 and 95 are connected to suction by way of the passage 96, chamber 85, opening 83 and recess 78. Suction is thus applied to the clutch operating servo-motor 36, to both chambers 74 and 75 of the servo-motor 38, and to the servo-motor 37. The clutch is therefore disengaged through the release levers 12 pulling back the spring abutment plate 128 against the springs 129, and the stop 46 is projected inwardly to limit the opening of the throttle valve by restricting movement of the pin 45 due to the suction acting in the servo-motor 37. Since suction acts on both sides of the intermediate plate 72 in the servo-motor 38, the stop 47 is not moved.

When the lever 14 is moved to engage a gear the switch 41 is changed over, and the solenoid 98 is deenergised. Assuming that the vehicle is stationary, so that the driven member of the clutch is not moving, and cannot therefore be running faster than the driving member the contacts 148, 149 remain open, and the relay 185 is not energised, so the circuit through the solenoid 97 is not completed, and the clutch servo-motor 36 leaves the clutch free for centrifugal engagement. The deenergisation of the solenoid 98 allows the throttle stop 46 to withdraw, and as the solenoid 98 is not energised, the stop 47 remains withdrawn. The driver, by opening the throttle valve manually, speeds up the engine until the clutch engages centrifugally, and the vehicle moves off.

When a change is made from one gear to another, with the vehicle in motion, the first movement of the gear lever 14, before disengaging, through movement of the shaft 18 and the connecting linkage, the previously engaged gear, changes over the switch 41 to close the circuit of the solenoid 98, there being sufficient lost motion in the linkage for the switch plunger 172 to ride off the cam strip 170 or 171 before the actual disengagement of the gear. The resulting movement of the valve head 101 acts, as described above, to apply suction to the clutch servo-motor 36 and to the throttle servo-motors 37 and 38, thus reducing the throttle opening and releasing the clutch before the gear is disengaged. The continued movement of the lever 14 engages another gear and as the fresh gear is engaged, also again changes over the switch 41, thus de-energising the solenoid 98. If the relative engine and vehicle speeds are such that the driving member of the clutch is over-running the driven member, the clutch-controlled contacts 148, 149 remain open, and the clutch servo-motor 36, as well as the throttle servo-motors, is connected to the atmosphere, so that the clutch re-engages and the throttle stop 46 is withdrawn. If, however, the driven member of the clutch is rotating at a higher speed than the driving member, the cam ring 157 is dragged forwardly by the driven plate 126, and the contacts 148, 149 are bridged by the edge of the cam slot. Since the clutch is disengaged, the switch 182 is closed, and the solenoid 97 is therefore energised, moving the valve head 99 to connect the conduits 93 and 95 to suction and cut them off from the air ports 104. As the solenoid 98 is now de-energised, the valve head 101 cuts off the conduit 94 from the suction, and that conduit is open to the atmosphere. The clutch servo-motor 36 is thus maintained operative to keep the clutch disengaged, and suction is applied to the chamber 75 of the servo-motor 38 to project the throttle-opening stop 47 inwardly. The engine is thus speeded up until the clutch driving member begins to over-run the driven member, and the cam-ring 157 is dragged backwardly to open the contacts 148, 149, and thus deenergise the solenoid 97. The clutch then re-engages, and the throttle stop 47 is retracted, leaving the throttle valve free for manual control.

The throttle stops 46 and 47 over-ride any manual setting of the throttle valve, the spring link 46 being extended or shortened to allow the throttle setting to change without alteration of the position of the throttle pedal.

When the clutch servo-motor 36 is operated to release the clutch, the pull rod 112 moves relatively to the valve body 111, against the spring 117, and the valve disc 116 is moved away from its seat. When the servo-motor allows the clutch to re-engage, the valve disc remains off its seat until initial contact of the clutch plates reduces the load on the pull rod, the spring 117 then urging the valve disc on to its seat, and thus reducing the rate of engagement of the clutch, the air then entering the working chamber 108 of the servo-motor only through the variable restriction device 119. As the needle 121 of this device is mechanically linked to the throttle pedal, in such a way as to cause the restriction to decrease as the throttle valve is opened, the speed of engagement of the clutch varies with the engine speed.

I claim:

1. Control mechanism for the friction clutch and engine throttle valve of a motor vehicle responsive to operation of a gear shift member controlling a variable speed gearbox, said control mechanism comprising servo-motor means, means operated by said servo-motor means to disengage the friction clutch, means operated by said servo-motor means to control the position of the engine throttle valve, control means for said servo-motor means, first actuating means for said control means responsive to movement of said gear shift member, second actuating means for said control means responsive to changes in the relative speeds of the driving and driven members of the friction clutch and means responsive to operation of said first actuating means to render said second actuating means operative, actuation of said control means by said first actuating means causing operation of the servo-motor means to disengage the friction clutch and limit the range of throttle valve opening to a small value, and actuation of said control means by said second actuating means causing operation of said servo-motor means to hold said clutch disengaged and limit the range of throttle valve opening to a large value.

2. Control mechanism for the friction clutch and engine throttle valve of a motor vehicle responsive to operation of a gear shift member controlling a variable speed gearbox, said control mechanism comprising fluid pressure servo-motor means, means operated by said fluid pressure servo-motor means to disengage the friction clutch, means operated by the said fluid pressure servo-motor means to control the position of the engine throttle valve, valve means to control said fluid pressure servo-motor means, first and second solenoids operative to actuate said valve means, a source of electric current, first switch means to connect said first solenoid to said source of electric current, said switch means being closed by gear disengaging movement of the gear shift member, second switch means to connect the said second solenoid to said source of electric current, means responsive to changes in the relative speeds of the driving and driven members of the friction clutch to close said second switch when the said driven member overruns the said driving member, third switch means in series with said second switch means, and means responsive to operation of the valve means by said first solenoid to close said third switch means, actuation of said valve means by said first solenoid causing operation of the servo-motor means to disengage the friction clutch and limit the range of throttle valve opening to a small value, and actuation of said valve means by said second solenoid causing operation of said servo-motor means to hold said clutch disengaged and limit the range of throttle valve opening to a large value.

3. Control mechanism as set forth in claim 2 wherein the control valve means comprises a body, a passage in said body permanently connected to a source of subatmospheric pressure, a pair of valve members, and means connecting each of said valve members to one of said solenoids.

4. Control mechanism as set forth in claim 2 including first, second, and third servo-motors constituting the servo-motor means, mechanical linkage connecting the first servo-motor and a clutch release bearing, stops operatively connected to said second and third servo-motors, and stop-engaging means moving with the throttle valve whereby the range of movement of said throttle valve is controlled by said stops.

References Cited in the file of this patent

UNITED STATES PATENTS

| | | |
|---|---|---|
| 1,999,366 | Maybach | Apr. 30, 1935 |
| 2,070,341 | Saives | Feb. 9, 1937 |
| 2,080,484 | Hunt | May 18, 1937 |
| 2,080,487 | Kettering | May 18, 1937 |
| 2,110,675 | Pike | Mar. 8, 1938 |
| 2,134,519 | Kliesrath et al. | Oct. 25, 1938 |
| 2,164,865 | Keiper | July 4, 1939 |
| 2,164,923 | Houston | July 4, 1939 |
| 2,175,179 | Caserta | Oct. 10, 1939 |
| 2,568,958 | Hey et al. | Sept. 25, 1951 |